United States Patent [19]

Uchibaba et al.

[11] Patent Number: 4,559,023
[45] Date of Patent: Dec. 17, 1985

[54] TORQUE DAMPER

[75] Inventors: Kouichi Uchibaba, Saitama; Tsutomu Hayashi, Tokyo; Haruo Ishikawa; Kouhei Ohzono, both of Saitama, all of Japan

[73] Assignee: Honda Giken Kogyo Kabushiki Kaisha, Tokyo, Japan

[21] Appl. No.: 592,601

[22] Filed: Mar. 22, 1984

[30] Foreign Application Priority Data

Mar. 23, 1983 [JP] Japan .................. 58-47178

[51] Int. Cl.$^4$ .............................................. F16D 7/02
[52] U.S. Cl. ..................................... 464/30; 74/7 C; 74/409; 74/411
[58] Field of Search .......................... 464/30, 37–39, 464/180; 74/409, 411, 7 C; 123/185 CA, 185 D; 192/56 R, 30 V, 109 D, 106.1

[56] References Cited

U.S. PATENT DOCUMENTS

| | | | |
|---|---|---|---|
| 2,546,633 | 3/1951 | Dodge | 192/109 D |
| 2,644,439 | 7/1953 | Behringer | 464/39 X |
| 2,683,512 | 7/1954 | Boice | 464/39 X |
| 4,272,973 | 6/1981 | Fu-Tsai | 192/56 R X |

*Primary Examiner*—Stephen Marcus
*Assistant Examiner*—Leo J. Peters
*Attorney, Agent, or Firm*—Lyon & Lyon

[57] ABSTRACT

A damping system for a drive train having a cam coupling mechanism which advances an intermediate member axially along a driven shaft under high torque loads. The intermediate member is spring biased and is associated with a variable volume chamber containing fluid. Damping mechanisms are positioned concentrically within the driven shaft and are in communication with the variable chamber. The damping mechanisms include a check valve for one-way communication with the lubricant supply system of the associated engine, and a flow restricter for generating damping energy. An accumulator piston accommodates volume changes resulting from operation of the piston and allows for leakage flow from the system to insure renewal of oil without temperature build-up and oil deterioration.

14 Claims, 4 Drawing Figures

TORQUE DAMPER

BACKGROUND OF THE INVENTION

The field of the present invention is damping systems for torque variations in a drive train.

Torque damping devices have been employed to reduce shock loading within a drive train. One such prior device is illustrated in FIG. 1. An output shaft from an engine or transmission is coupled to a drive shaft by means of a drive member. The drive member may be splined to the drive shaft such that it can move axially relative thereto. The splines require the rotation of the drive member with the drive shaft. The drive member is also coupled to the output shaft of the engine or transmission by means of a cam coupling mechanism. Such a mechanism includes cam followers fixed to one or the other of the output shaft and drive member. A cam is fixed to the other of these drive elements and has a radially extending cam surface upon which the follower rides. With increased or decreased torque loading, relative rotation between the output shaft and the drive member is allowed through a relatively small angle for relieving transitory loads. As the output shaft and the drive member experience some relative angular rotation, the drive member is also moved axially against a bias spring.

Also associated with such damping systems have been fluid damping cylinders. In such a system, a concentrically arranged piston and sleeve may be employed to define an oil chamber on either side of the piston. An orifice extends through the piston to allow for damping flow between chambers. One of the piston and sleeve is fixed to the drive member while the other is fixed to the drive shaft. Through such an arrangement, some relative rotation is provided between elements of the drive train. This relative rotation is resisted by both a bias spring member and by fluid damping. Torque peaks or shock may thus be reduced within the drive train by such spring loading and damped relative rotation of the drive components.

In two-wheeled vehicles and the like which have incorporated such systems, the power train is generally required to be very compact. The foregoing device, illustrated in FIG. 1, requires some axial space to accommodate both oil chambers arranged in series along the mechanism. Consequently, on compact drive systems, such a mechanism may be difficult to include. Additionally, such mechanisms tend to employ the same oil between servicing. The damping action to which such oil is subjected can lead to oil overheating which may result in fluid deterioration.

SUMMARY OF THE INVENTION

The present invention is directed to a torque damping system for a drive train employing a piston and sleeve mechanism to form a single variable volume chamber. Within the drive shaft, a fluid damper functions to derive damping energy from this single chamber defined by the piston and sleeve. Lubricant from the lubricant supply system of the engine supplies fluid to the damping system on a continuous basis when the engine is on. Some flow may be accommodated from such a system to insure against long-term fluid deterioration. The damping mechanism may be located axially inwardly of the variable volume chamber so as to reduce the axial length of the damping system.

To accomplish the foregoing, a check valve may be employed in the passageway within the drive shaft to prevent flow toward the lubricant supply system. A flow restricter may be positioned between the fluid communication with the variable volume chamber and an accumulator piston such that flow from the variable volume chamber when the chamber is compressed will not flow to the lubricant supply system but will be accumulated through the flow restricter.

Accordingly, it is an object of the present invention to provide an improved damping system for a drive train. Other and further objects and advantages will appear hereinafter.

DETAILED DESCRIPTION OF THE PREFERRED EMBODIMENT

Figure 1:
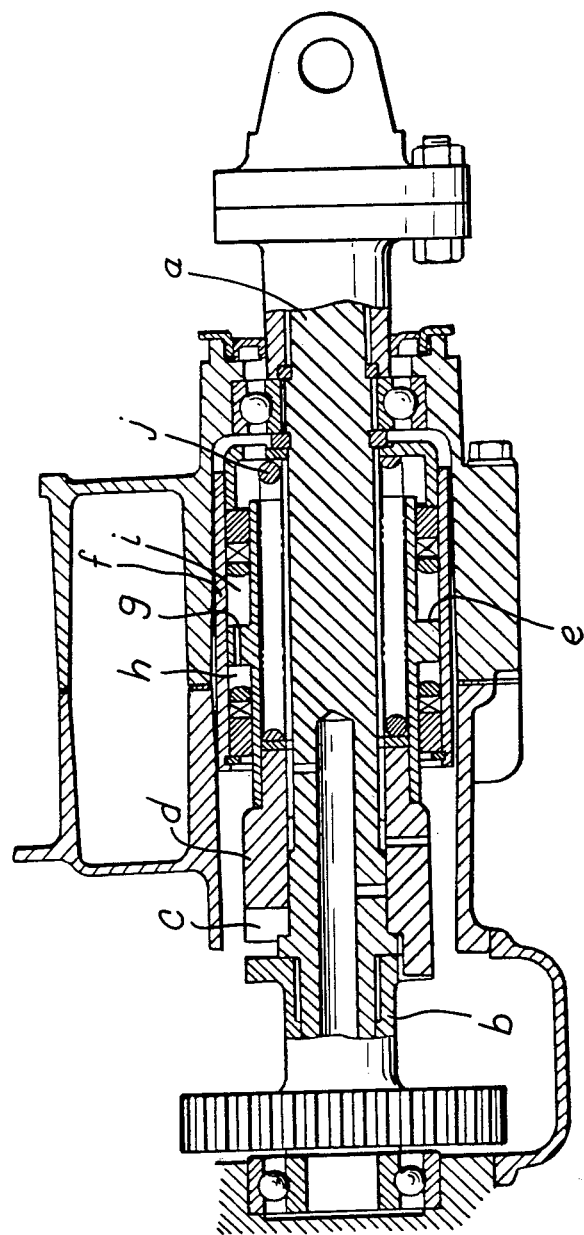
FIG. 1 is a cross-sectional elevation of a prior art torque damper.

Turning in detail to the drawings, the prior art device discussed in the background is illustrated in FIG. 1. The output from the engine is transmitted to a drive shaft a through a torque damper. The torque damper includes a cam coupling mechanism including a cam follower b and a cam c. The cam c has a radially extending surface upon which the cam follower b rides. The cam c is part of a drive member d which is mounted on the driven shaft a by splines such that the member d may move axially relative to the shaft a but is constrained from rotating relative to the shaft. A piston e is associated with the drive member d to stroke within a sleeve f fixed relative to the drive shaft a. An orifice g permits flow from the two oil chambers h and i for damping purposes. A spring j biases the drive member d toward the cam follower b.

Figure 2:
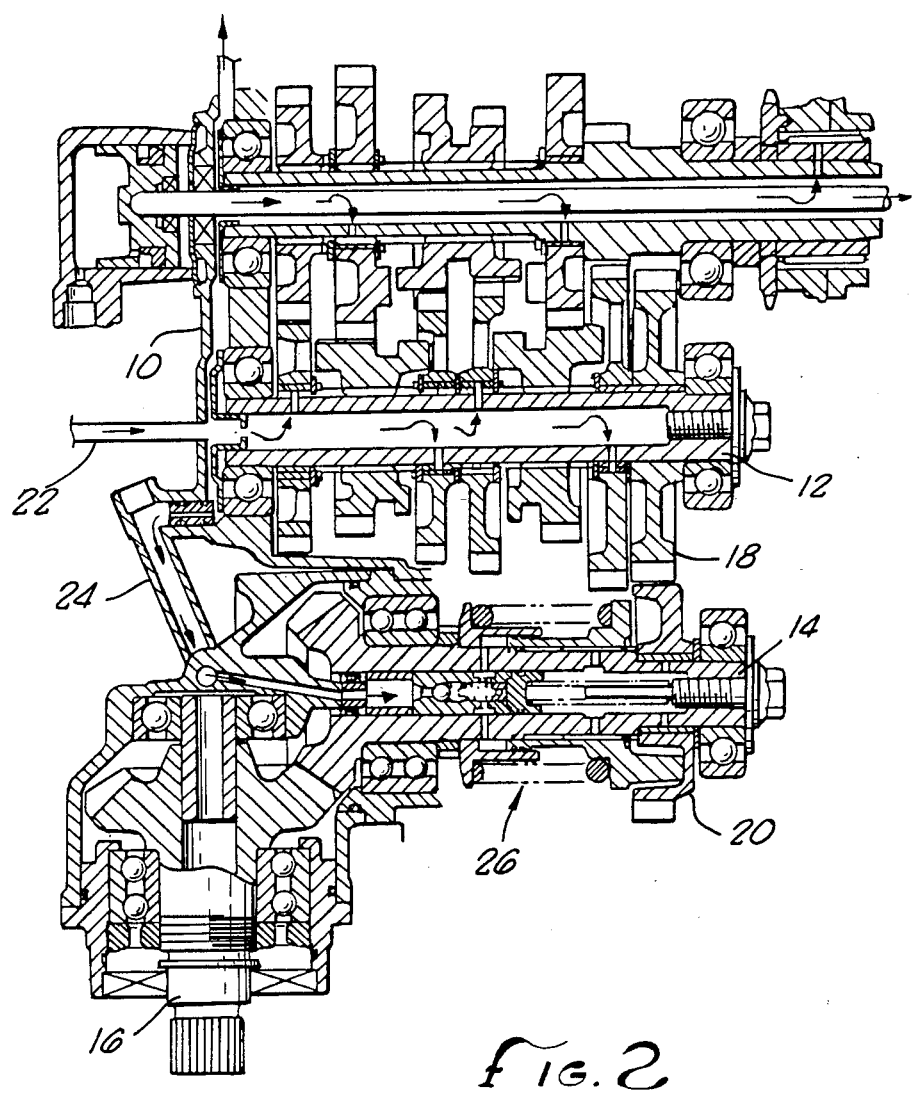
FIG. 2 is a cross-sectional elevation of a transmission employing a torque damper of the present invention.
Figure 3:
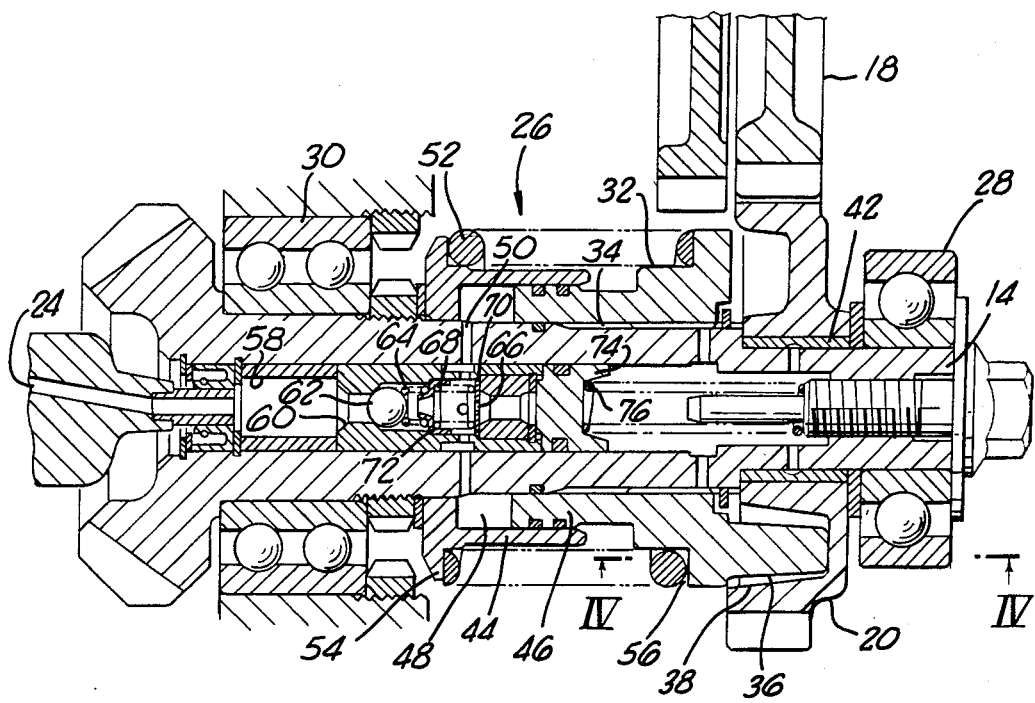
FIG. 3 is a cross-sectional elevation illustrating the torque damper of the present invention in greater detail.
Figure 4:
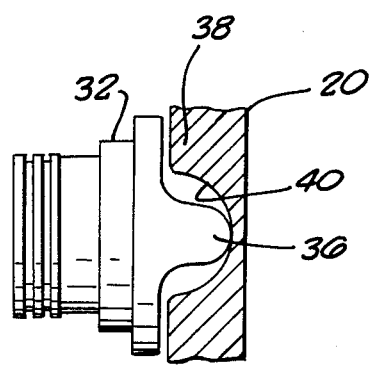
FIG. 4 is a cross-sectional view taken along line IV—IV of FIG. 3.

Looking to the mechanism of FIGS. 2, 3 and 4, a case 10 is illustrated within which a transmission mechanism is located. The mechanism includes a countershaft 12 and a driven shaft 14. A final output shaft 16 directs power from the mechanism. To couple the countershaft 12 and the driven shaft 14, a gear wheel 18 meshes with a driven gear wheel 20. The driven gear wheel 20 is mounted such that it may rotate relative to the driven shaft.

Lubricant flow is illustrated by a plurality of arrows in FIG. 2. Communication is shown to exist between the lubricant source 22 and the driven shaft 14 through a lubricant passage 24 extending to a concentric location in the shaft 14 to feed the torque damper, generally designated 26.

Turning then to FIGS. 3 and 4, providing large details of the torque damper 26, the driven shaft 14 is shown to be rotatably mounted within bearings 28 and 30. A first drive member 32 is concentrically mounted about the driven shaft 14. Axial splines 34 constrain the first drive member to rotate with the driven shaft 14 but allow relative axial movement therebetween. Extending from one end of the first driven member 32 is a cam follower 36. Normally, two cam followers diametrically opposed on the first drive member 32 provide balanced loading. The driven gear wheel 20 cooperates with the cam follower 36 by providing a cam 38 having radially extending cam surfaces 40 to which the cam followers 36 extend. This relationship is best illustrated in FIG. 4. As can also be seen in FIG. 4, as the gear wheel 20 rotates relative to the first drive member 32, the components will be axially displaced one from the other. Conversely, as the follower 36 returns to the relaxed position as illustrated in FIG. 4, the gear wheel 20 and the first drive member 32 will move toward one another. This mechanism provides the torque coupling between the driven shaft 14 forming a second drive member and the gear wheel 20 forming a third drive member. The gear wheel 20 is shown to be rotatably mounted relative to the driven member 14 on a bushing 42.

Spaced from the cam coupling mechanism and fixed to the driven shaft 14 is a sleeve 44. The sleeve 44 is concentrically mounted to the driven shaft 14 and extends axially to define an annular cavity between the sleeve 44 and the periphery of the driven shaft 14. Extending into the cavity thus formed is an annular piston 46. The annular piston 46 is integral with the first drive member 32 which is able to move axially relative to the driven shaft 14 and in turn the sleeve 44. Thus, a variable volume chamber 48 is formed within the sleeve 44 and is closed by the piston 46.

During operation of the drive train the first drive member 32 is caused to move axially back and forth on the driven shaft 14 according to the torque load imposed on the drive train. This is a result of cooperation between the cam 38 and cam follower 36 of the cam coupling mechanism. In turn, the piston 46 moves axially relative to the driven shaft 14 so as to increase and reduce the variable volume 48. When increased torque is applied to the drive train, the piston advances to reduce the volume of the chamber 48. As torque is reduced, the volume is increased. The motion of the piston 46 drives oil contained within the chamber 48 through passageways 50 into and from the interior of the driven shaft 14.

To insure that the cam follower 36 in fact follows the cam surface 40 and to retract the piston 46 such that the chamber 48 is enlarged, a spring 52 extends between a flange 54 on the sleeve 44 and a shoulder 56 on the first drive member 32. The spring 52 is maintained in compression to bias the first drive member 32 toward the gear wheel 20.

Located concentrically within the driven shaft 14 is a passage 58. The passage 58 is in communication at a first end with the lubricant supply passage 24. The passageways 50 are also in communication with the central passage 58. Positioned within the passage 58 is a valve sleeve 60. The valve sleeve 60 provides a seat for a check valve 62. The check valve 62 operates in a conventional manner to allow flow in one direction, toward the right in FIG. 3, and prevent flow in the other direction. A bias spring 64 retains the check valve 62 in the seated condition except when relative pressure promotes flow therethrough.

The check valve 62 is located between the source of lubricant and the passageways 50 in communication with the variable volume chamber 48. Thus, when the piston 46 compresses the chamber 48, flow through the passageways 50 will not return to the lubricant supply system. To relieve the incoming flow from the variable volume chamber 48, the passage 58 extends beyond the point of communication with the passageways 50 to form further internal volume. A flow restricter 66 defined by a thin plate with a hole therethrough divides the internal volume of the passage 58. This flow restricter 66 is held in place by means of a bias spring 68 against a shoulder 70 formed in the passage 58. The two internal bias springs 64 and 68 are maintained in position by means of a spring keeper 72. Through this arrangement, the flow restricter 66 and the check valve 62 are on opposite sides of the point of communication with the surrounding annular variable volume chamber 48. On the opposite side of the flow restricter from the check valve 62 is an accumulator piston 74. The accumulator piston 74 is biased toward the passage 58 by means of a spring 76 to reduce the volume of the passage 58. However, when the variable volume chamber 48 is compressed, the increased fluid volume directed into the passage 58 is accommodated by the accumulater piston 74.

The arrangement of the torque damper is designed for relative compactness and efficiency of design. The variable volume chamber 48 is located radially outwardly of the damping mechanism itself. In this way, axial length of the unit is substantially reduced. The elements of the damping system are shown to be concentrically mounted within the rotating driven shaft 14. In this way, centrifugal force does not affect the components such as the check valve 62 or the orifice plate of the flow restricter 66.

In operation, starting of the engine of the drive train will result in lubricant pressure supplied to the damping device. When driven, torque increases will cause the first drive member 32 to move axially on the driven shaft 14. This motion will affect the variable volume chamber which in turn results in damping flow through the flow restricter. As more fluid may be required, pressurized lubricant is allowed past the check valve 62 to supply the system. Lubricating fluid is allowed to flow from this system, primarily through leakage about the accumulator piston 74. As a result, lubrication is affected on the other parts of the system. In addition, lubricant is thus changed periodically in order that temperature will not build up to change the response characteristics or deteriorate the oil.

With the present arrangement of the flow restricter, when torque is released from the drive train, the piston 46 will retract. This creates a reduced pressure in the damping system. By having the flow restricter include an orifice plate which is biased against the shoulder 70, the orifice plate may move quickly to the left, as seen in FIG. 3, so as to accommodate that release of torque. As a result, there is no tendency for air to be drawn into the damping system.

Thus, a torque damper of compact and efficient design has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A torque damper for a power train having an engine with a lubricant supply system, comprising
  first and second coaxially arranged drive members, said first drive member being fixed to rotate with and being mounted to slide axially relative to said second drive member;
  a sleeve fixed about said second drive member;

a piston fixed to said first drive member and extending into said sleeve to form a variable volume chamber; and a passage in said second drive member being in communication with the lubricant supply system and said variable volume chamber, said passage including a check valve restricting flow communication toward said lubricant supply system, a flow restricter in said passage and an accumulater piston, said passage being in communication with said variable volume chamber between said check valve and said flow restricter and said flow restricter being between said check valve and said accumulater piston.

2. The torque damper of claim 1 wherein said flow restrictor includes an orifice plate and a sbring, said passage including a shoulder between said accumulator piston and said orifice plate facing toward said check valve, said spring biasing said orifice plate against said shoulder.

3. The torque damper of claim 1 wherein said passage extends concentrically within said second drive member.

4. The torque damper of claim 3 wherein said variable volume chamber is radially outwardly of said passage.

5. The torque damper of claim 1 wherein said accumulator piston accommodates leakage thereabout in said passage.

6. A torque damper for a power train having an engine with a lubricant supply system, comprising a cam coupling mechanism;

first, second and third coaxially arranged drive members, said first drive member being fixed to rotate with and being mounted to slide axially relative to said second drive member and said third drive member being coupled to said first drive member by said cam coupling mechanism which is constructed and arranged to extend axially with relative rotation between said first and said third drive members;

a sleeve fixed about said second drive member;

a piston fixed about said first drive member and extending into said sleeve to form a variable volume chamber; and a passage in said second drive member being in communication with the lubricant supply system and said variable volume chamber, said passage including a check valve restricting flow communication toward said lubricant supoly system, a flow restricter in said passage and an accumulator piston, said passage being in communication with said variable volume chamber between said check valve and said flow restricter and said flow restricter being between said check valve and said accumulator piston.

7. The torque damper of claim 6 wherein said flow restricter includes an orifice plate and a spring, said passage including a shoulder between said accumulator piston and said orifice plate facing toward said check valve, said spring biasing said orifice plate against said shoulder.

8. The torque damper of claim 6 wherein said passage extends concentrically within said second drive member.

9. The torque damper of claim 8 wherein said variable volume chamber is radially outwardly of said passage.

10. The torque damper of claim 6 wherein said accumulator piston accommodates leakage thereabout in said passage.

11. A torque damper for a power train having an engine with a lubricant supply system, comprising a cam coupling mechanism;

a first drive member;

a driven shaft, said first drive member being coaxially arranged about said driven shaft, fixed to rotate therewith and mounted to slide axially relative to said driven shaft;

a gear wheel rotatably mounted on said driven shaft and coaxially arranged therewith, said gear wheel being coupled to said first drive member by said cam coupling mechanism which includes a cam follower fixed to said first drive member and a cam fixed to said gear wheel having a cam surface extending radially and constructed and arranged to extend axially with relative rotation between said first drive member and said gear wheel;

a sleeve fixed about said driven shaft;

a piston fixed to said first drive member and extending into said sleeve to form a variable volume chamber; and a passage in said second drive member being in communication with the lubricant supply system and said variable volume chamber, said passage including a check valve restricting flow communication toward said lubricant supply system, a flow restricter in said passage and an accumulator piston, said passage being in communication with said variable volume chamber between said check valve and said flow restricter and said flow restricter being between said check valve and said accumulator piston, said accumulator piston accommodating leakage thereabout in said passage.

12. The torque damper of claim 11 wherein said flow restricter includes an orifice plate and a spring, said passage including a shoulder between said accumulater piston and said orifice plate facing toward said check valve, said spring biasing said orifice plate against said shoulder.

13. The torque damper of claim 11 wherein said passage extends concentrically within said driven shaft.

14. The torque damper of claim 13 wherein said variable volume chamber is radially outwardly of said passage.

* * * * *